(12) United States Patent
Hiramoto et al.

(10) Patent No.: US 8,628,279 B2
(45) Date of Patent: Jan. 14, 2014

(54) CHIP DISCHARGE DEVICE FOR MACHINE TOOL

(75) Inventors: Kazuyuki Hiramoto, Nara (JP); Akihiro Mochizuki, Nara (JP); Yuya Hasegawa, Nara (JP)

(73) Assignee: Mori Seiki Co., Ltd., Yamato-Koriyama, Nara (JP)

( * ) Notice: Subject to any disclaimer, the term of this patent is extended or adjusted under 35 U.S.C. 154(b) by 951 days.

(21) Appl. No.: 12/756,480

(22) Filed: Apr. 8, 2010

(65) Prior Publication Data
US 2010/0266358 A1 Oct. 21, 2010

(30) Foreign Application Priority Data
Apr. 21, 2009 (JP) ................................. 2009-102754

(51) Int. Cl.
*B23Q 11/00* (2006.01)

(52) U.S. Cl.
USPC ............................................. 409/137; 408/58

(58) Field of Classification Search
USPC ......... 409/137, 253, 204, 211, 212, 215, 216; 408/58
See application file for complete search history.

(56) References Cited

U.S. PATENT DOCUMENTS

| | | | | |
|---|---|---|---|---|
| 2,349,156 | A * | 5/1944 | Fischer | 408/56 |
| 2,527,968 | A * | 10/1950 | Sherman et al. | 408/14 |
| 3,308,689 | A * | 3/1967 | MacDonald | 408/204 |
| 3,694,099 | A * | 9/1972 | Nicholas | 408/58 |
| 3,828,649 | A * | 8/1974 | Lecailtel et al. | 409/137 |
| 4,657,453 | A * | 4/1987 | Goulot et al. | 409/216 |
| 4,909,681 | A * | 3/1990 | Drier, Jr. | 409/137 |
| 5,033,917 | A * | 7/1991 | McGlasson et al. | 408/67 |
| 5,332,343 | A * | 7/1994 | Watanabe et al. | 409/136 |
| 5,615,983 | A * | 4/1997 | Hoekstra | 409/132 |
| 5,762,691 | A * | 6/1998 | Gondar | 96/60 |
| 5,947,661 | A * | 9/1999 | Sugata | 409/131 |
| 6,059,702 | A * | 5/2000 | Winkler et al. | 483/13 |
| 6,086,292 | A * | 7/2000 | Yokoyama | 408/67 |
| 6,122,808 | A * | 9/2000 | Popp | 29/49 |

(Continued)

FOREIGN PATENT DOCUMENTS

| | | |
|---|---|---|
| JP | 10-94911 A | 4/1998 |
| JP | 2005-532917 A | 11/2005 |

(Continued)

*Primary Examiner* — David Bryant
*Assistant Examiner* — Christopher Koehler
(74) *Attorney, Agent, or Firm* — Westerman, Hattori, Daniels & Adrian, LLP

(57) ABSTRACT

A chip discharge device for a machine tool is provided that has a simple structure, enables automatic replacement of tools, and is suitable for a machine tool in which a spindle head is turned about an axis of turning that is not parallel to the center axis of the spindle. A suction pipe 73 on the first support member side is disposed in parallel to a first axis of turning 191 to be centered on the axis of the through hole 192 of a first support member. A right end of the suction pipe 73 on the first support member side is fixed by bolts to a left end surface of the spindle head 18. An outer circumferential surface of the left end of the suction pipe 73 on the first support member side is connected to be able to relatively rotate to an inner circumferential surface at the lower end of a second communicating pipe 74. A seal mechanism 8 is provided in the connection portion, preventing the external air from being sucked into the second communicating pipe 74.

9 Claims, 6 Drawing Sheets

(56) References Cited

U.S. PATENT DOCUMENTS

| | | | |
|---|---|---|---|
| 6,557,784 B1* | 5/2003 | Nakamura et al. | 239/427 |
| 6,926,478 B2* | 8/2005 | Sugata et al. | 409/136 |
| 7,311,481 B2* | 12/2007 | Kammermeier et al. | 409/137 |
| 7,419,341 B2* | 9/2008 | Granger | 409/137 |
| 7,563,062 B1* | 7/2009 | Chen | 409/230 |
| 7,665,937 B2* | 2/2010 | Kammermeier et al. | 409/132 |
| 8,083,445 B2* | 12/2011 | Hyatt et al. | 409/137 |
| 8,096,737 B2* | 1/2012 | Tada et al. | 409/233 |
| 8,296,923 B2* | 10/2012 | Wampler et al. | 29/560 |
| 2005/0129476 A1* | 6/2005 | Kammermeier et al. | 409/132 |
| 2006/0251485 A1* | 11/2006 | Hirschburger et al. | 409/137 |
| 2006/0291970 A1* | 12/2006 | Granger | 409/137 |
| 2008/0069651 A1 | 3/2008 | Kammermeier et al. | |
| 2009/0000441 A1* | 1/2009 | Hasebe et al. | 83/53 |
| 2009/0279975 A1 | 11/2009 | Tada et al. | |

FOREIGN PATENT DOCUMENTS

| | | |
|---|---|---|
| JP | 4152942 B2 | 9/2008 |
| JP | 2009-274147 A | 11/2009 |
| WO | 03/097283 A1 | 11/2003 |

* cited by examiner

CHIP DISCHARGE DEVICE FOR MACHINE TOOL

FIELD OF THE INVENTION

The present invention relates to a chip discharge device for a machine tool and more particularly to a chip discharge device adapted to a machine tool in which a spindle head is turned about an axis of turning that is not parallel to the axis of the spindle in order to machine works of complex shape.

BACKGROUND OF THE INVENTION

When boring is carried out with a rotary tool, chips remain inside the hole and the chips are heated and hardened by the cutting heat generated during the processing. Where the rotary tool comes into contact with the consolidated chips, a large cutting resistance acts upon the rotary tool and the rotary tool can be damaged. Further, where graphite or a light alloy such as a magnesium alloy is machined, powder-like chips are generated. Because these powder-like chips are scattered over a wide area in the machine tool, a certain time is required to conduct cleaning after the machining, problems of care for workers' health may occur and an adverse effect may be produced on the durability of apparatus.

A tool described in Japanese Translation of PCT Application No. 2005-532917: Patent Document 1 is known as a milling tool that can recover powder-like chips generated when a magnesium alloy is cut. This milling tool has a suction opening formed to be centered on the axis of a shank and the suction opening communicates with a draft hopper mounted on a tightening and feeding device. As the draft hopper is mounted on a tightening and feeding device in the milling tool described in Patent Document 1, such a resultant problem occurs that the structure is complex and the tool cannot be automatically replaced due to the structure.

The applicant has developed a spindle structure disclosed in Japanese Patent Application Laid-open No. 2009-274147 as a chip discharge device of a simple structure that has a spindle structure that enables automatic replacement of tools. In the spindle structure disclosed in Japanese Patent Application Laid-open No. 2009-274147, cutting chips are discharged to the outside from the rear end of the spindle via a through hole formed in the axial center of a draw bar. However, the spindle structure disclosed in Japanese Patent Application Laid-open No. 2009-274147 is not assumed to be a machine tool for machining of works of complex shape by turning a spindle head, as with the universal head disclosed in Japanese Patent Application Laid-Open No. H10-94911: Patent Document 2. Therefore, with the spindle structure disclosed in Japanese Patent Application Laid-open No. 2009-274147, the cutting chips cannot be discharged to the outside from the rear end of the spindle without hindering the turning motion of the spindle head.

SUMMARY OF THE INVENTION

It is an object of the present invention to provide a chip discharge device for a machine tool that has a simple structure, enables automatic replacement of tools and is suitable for a machine tool in which a spindle head is turned about an axis of turning that is not parallel to the axis of the spindle in order to machine works of complex shape.

The above-described problems are resolved by the following means. Thus, the chip discharge device for a machine tool according to the first aspect of the invention comprises: a spindle head; a spindle that is supported by the spindle head to be pivotal with respect thereto and provided with a spindle through hole formed to be centered on the axis of the spindle and parallel to the axis line thereof and that can attach thereto a tool holder having a chip suction hole formed therein for sucking in chips as waste by machining; a draw bar that is inserted into the spindle through hole so that the draw bar can move in parallel to the spindle center axis line in order to clamp the tool holder to the spindle and unclamp the tool holder therefrom and provided with a draw bar through hole that is formed to be centered on the axis of the draw bar and parallel to the axis line thereof, the draw bar through hole allowing the chips to pass therethrough, and a first support member that supports the spindle head so that the spindle head can be turned about a first axis of turning that is not parallel to the spindle axis line and has a through hole of the first support member formed therein to be centered on the axis thereof, the through hole of the first support member being parallel to the first axis of turning and allowing the chips to pass therethrough.

The chip discharge device for a machine tool according to the second aspect of the invention is the chip discharge device for a machine tool according to the first aspect of the invention, further comprising: a hollow chip suction pipe on the spindle side that is inserted into the draw bar through hole, communicates at one end with a chip suction hole of the tool holder and is fixed at the other end to the spindle head, and a hollow chip suction pipe on the first support member side that is inserted into the through hole of the first support member, communicates at one end with the chip suction pipe on the spindle side and communicates at the other end with a chip suction device.

The chip discharge device for a machine tool according to the third aspect of the invention is the chip discharge device for a machine tool according to the first aspect of the invention, further comprising a hollow chip suction pipe on the spindle side that is inserted into the draw bar through hole; a hollow chip suction pipe on the first support member side that is inserted into the through hole of the first support member; a second support member that supports the first support member so that the first support member can be turned about a second axis of turning that is not parallel to the first axial of turning and that has a second support member through hole formed to be centered on the axis thereof and parallel to the second axis of turning; and a hollow chip suction pipe on the second support member side that is inserted into the second support member through hole, wherein the chip suction pipe on the spindle side communicates at one end with a chip suction hole of the tool holder and fixed at the other end to the spindle head, the chip suction pipe on the first support member side communicates at one end with the chip suction pipe on the spindle side and communicates at the other end with the chip suction device on the second support member side, and the chip suction pipe on the second support member side communicates at one end with the chip suction pipe on the first support member side and communicates at the other end with the chip suction device.

The chip discharge device for a machine tool according to the fourth aspect of the invention is the chip discharge device for a machine tool according to the third aspect of the invention, wherein the spindle axis line and the first axis of turning are orthogonal to each other, and the first axis of turning and the second axis of turning are orthogonal to each other.

The chip discharge device for a machine tool according to the fifth aspect of the invention is the chip discharge device for a machine tool according to the third aspect of the invention, wherein the chip suction pipe on the first support member side and the chip suction pipe on the second support member side are connected to be able to rotate relatively about the second axis of turning.

The chip discharge device for a machine tool according to the sixth aspect of the invention is the chip discharge device for a machine tool according to the third aspect of the invention, further comprising a first hollow communicating pipe that causes the other end of the chip suction pipe on the spindle side and one end of the chip suction pipe on the first support member side to be communicated with in a smooth manner and is detachably secured to the spindle head.

The chip discharge device for a machine tool according to the seventh aspect of the invention is the chip discharge device for a machine tool according to the third aspect of the invention, further comprising a second hollow communicating pipe that causes the other end of the chip suction pipe on the first support member side and one end of the chip suction pipe on the second support member side to be communicated with in a smooth manner and is detachably secured to the first support member.

The chip discharge device for a machine tool according to the eighth aspect of the invention is the chip discharge device for a machine tool according to the sixth aspect of the invention, wherein the chip suction pipe on the spindle side, the chip suction pipe on the first support member side, the chip suction pipe on the second support member side and the first communicating pipe have a substantially identical inner diameter.

The chip discharge device for a machine tool according to the ninth aspect of the invention is the chip discharge device for a machine tool according to the seventh aspect of the invention, wherein the chip suction pipe on the spindle side, the chip suction pipe on the first support member side, the chip suction pipe on the second support member side and the second communicating pipe have a substantially identical inner diameter.

In the chip discharge device for a machine tool in accordance with the present invention, the chip suction pipe on the first support member side is disposed so that the chip suction pipe on the first support member side can rotate about the axis of the through hole of the first support member relative to the spindle head support member. Therefore, the chip suction pipe on the first support member side does not interfere with the peripheral members of the spindle head and, when the spindle head is turned with respect to the spindle head support member, the chip suction pipe on the first support member side can discharge chips to the outside through the inside of the spindle head support member without hindering the turning motion of the spindle head.

Further, in the chip discharge device for a machining tool in accordance with the present invention, the chip suction pipe on the second support member side is disposed so that the chip suction pipe on the second support member side can rotate about the axis of the through hole of the second support member relative to the spindle head support member. Therefore, the chip suction pipe on the second support member side does not interfere with the peripheral members of the spindle head and, when the spindle head is turned with respect to the spindle head support member, the chip suction pipe on the second support member side can discharge chips to the outside through the inside of the second support member without hindering the turning motion of the spindle head.

Further, in the chip discharge device for a machine tool in accordance with the present invention, the first communicating pipe and the second communicating pipe are connected in a smooth manner to the chip suction pipe on the spindle side, chip suction pipe on the first support member side and chip suction pipe on the second support member side. Therefore, chips can be smoothly discharged. Further, because the first communicating pipe and the second communicating pipe are detachably secured to the spindle head or spindle head support member, the inside of the communicating pipes and the inside of the chip suction pipes can be easily cleaned.

Further, in the chip discharge device for a machine tool in accordance with the present invention, the chip suction pipe on the spindle side, first communicating pipe, chip suction pipe on the first support member side, second communicating pipe and chip suction pipe on the second support member side have an identical inner diameter. Therefore, the chips can be smoothly discharged to the outside with little accumulation.

DETAILED DESCRIPTION OF PREFERRED EMBODIMENTS

Figure 1:
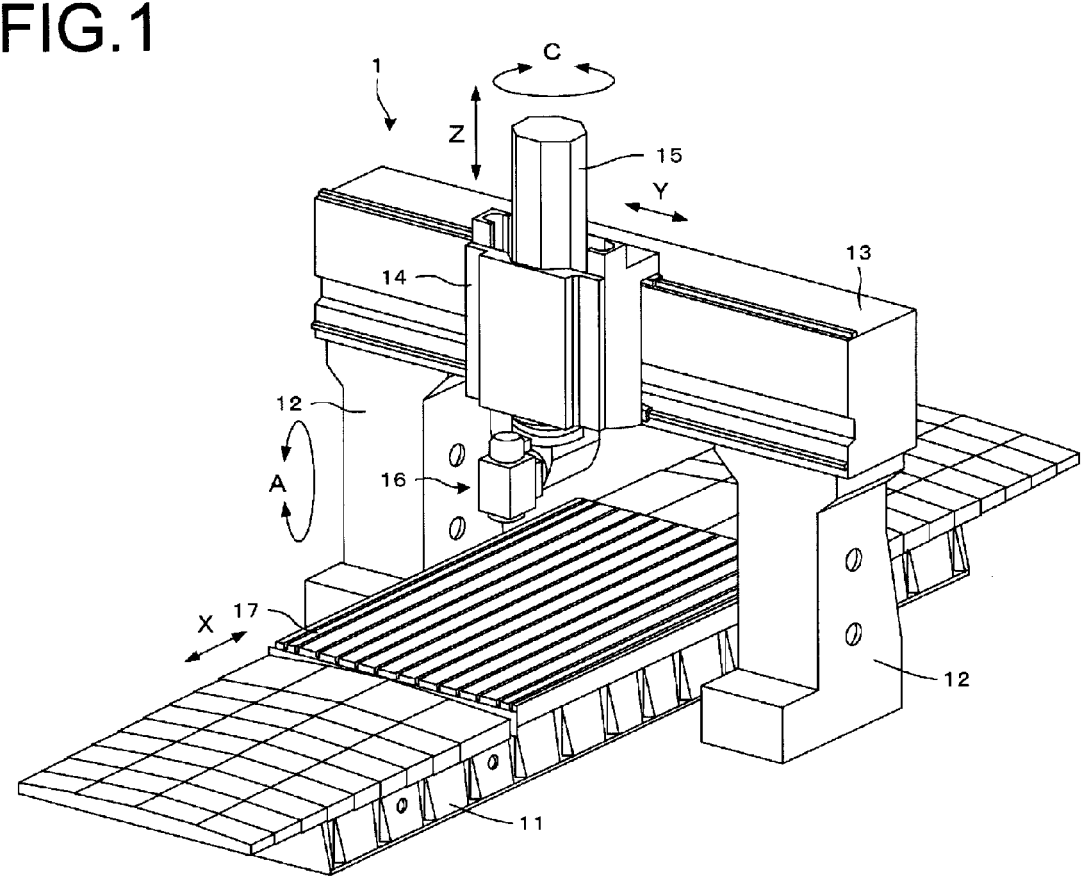
FIG. 1 is a perspective view of a bridge type machining center having a chip discharge device for a machining tool according to an embodiment of the present invention.
Figure 2:
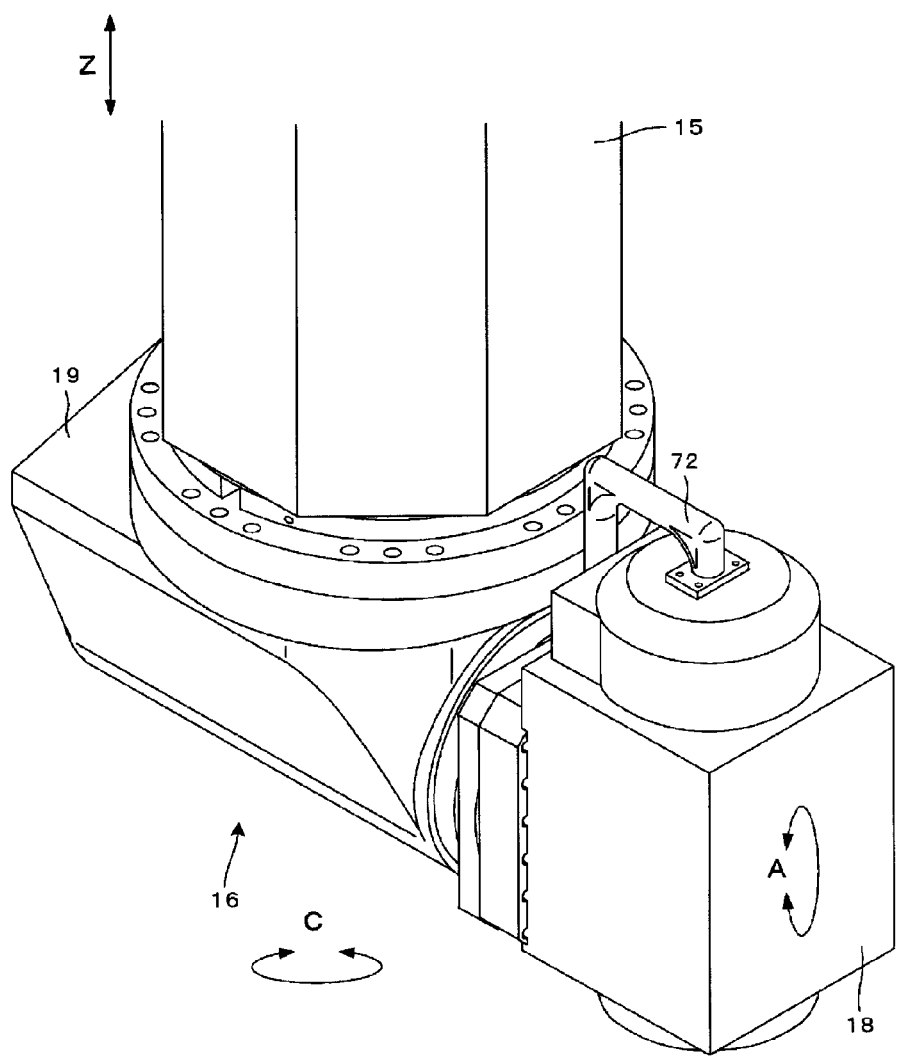
FIG. 2 is a perspective view of a universal head of the bridge type machining center shown in FIG. 1.

Embodiments of the present invention will be described below with reference to the appended drawings. FIG. 1 is a perspective view of a bridge type machining center having a chip discharge device for a machining tool according to an embodiment of the present invention. FIG. 2 is a perspective view of a universal head of the bridge type machining center shown in FIG. 1. In the bridge type machining center 1 shown in FIG. 1, a bed 11 and columns 12, 12 are disposed on a floor surface. The columns 12, 12 are disposed with left-right symmetry as viewed from the front (in X axis direction). A cross rail 13 is disposed to extend horizontally in the left-right direction and supported at the upper end of the columns 12, 12.

The bridge type machining center 1 is configured in a bridge shape with the pair of columns 12, 12 disposed perpendicular to the floor surface and the cross rail 13 that spans horizontally between the pair of columns 12, 12. The cross rail 13 is provided with a saddle 14 that can move in the Y axis direction (left-right direction). The saddle 14 is provided with a ram (second support member) 15 that can move in Z axis direction (vertical direction).

A table 17 is provided so that it can move in X axis direction (front-rear direction) on the bed 11. A universal head 16 is mounted on the lower portion (lower end portion) of the ram 15. The universal head 16 performs a C-axis direction movement that is a turning motion in a horizontal plane and an A-axis direction movement that is a turning motion in a vertical plane. The universal head 16 is constituted by a spindle head 18, a spindle head support member (first support member) 19 which supports the spindle head 18 so that the spindle head can be turned in A-axis direction and other members. The spindle head support member 19 is supported at the lower portion of the ram (second support member) 15 so that the spindle head support member can be turned in C-axis direction.

Figure 3:
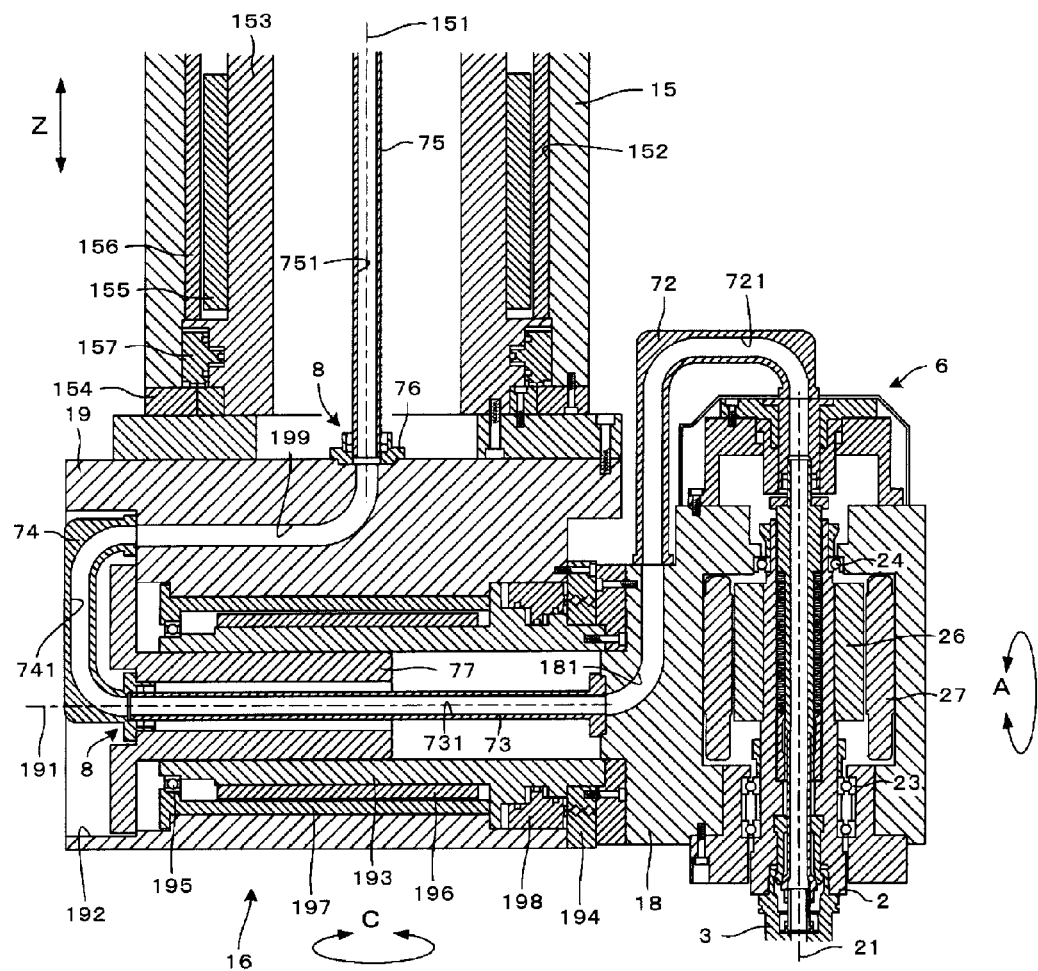
FIG. 3 is a vertical sectional view of the universal head shown in FIG. 2 according to the first embodiment of the present invention.
Figure 4:
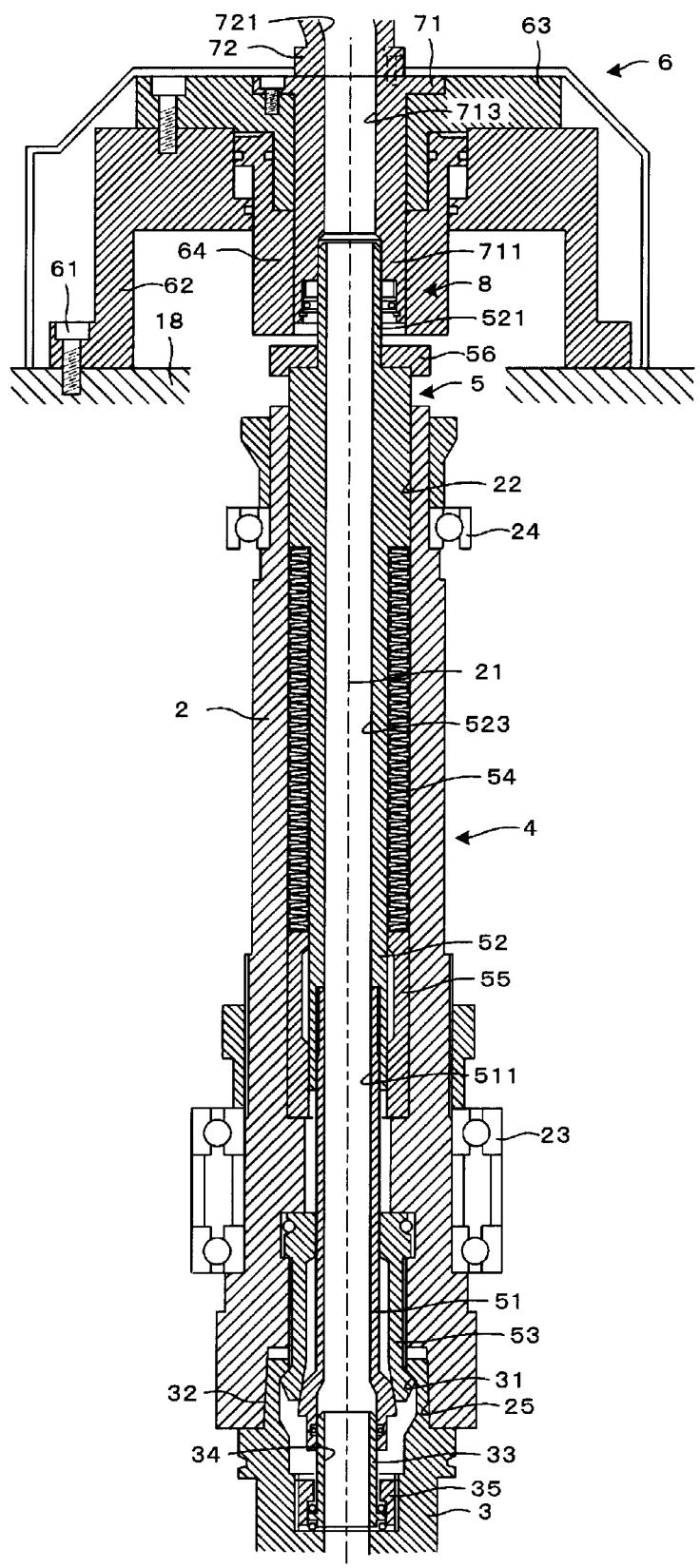
FIG. 4 is an enlarged vertical cross-sectional view of the spindle shown in FIG. 3 according to the first embodiment of the present invention.

FIG. 3 is a vertical sectional view of the universal head shown in FIG. 2 according to the first embodiment of the present invention. FIG. 4 is an enlarged vertical cross-sectional view of the spindle shown in FIG. 3 according to the first embodiment of the present invention. As shown in FIG. 3 and FIG. 4, the spindle head 18 is provided with a spindle 2 that is rotatably supported on the spindle head 18, a tool holder 3 that is mounted on a distal end portion of the spindle 2 and a clamp mechanism 4 that clamps the tool holder 3 to the spindle and unclamps the tool holder therefrom.

The spindle 2 is a tubular body having a spindle through hole 22 therein parallel to and centered on a spindle axis line 21. The spindle 2 is rotatably supported on the spindle head 18 via a front bearing 23 at the front portion and via a rear bearing 24 at the rear portion. A tapered hole 25 is formed in the front end portion of the spindle through hole 22 of the spindle 2 and the tool holder 3 is fitted in the tapered hole 25 to be fixed thereto. A rotor 26 is fixed to the spindle 2 on its outer circumferential surface and a stator 27 is fixed to the spindle head 18 on its inner circumferential surface. The stator 27 is disposed so as to surround the rotor 26, being spaced apart by a certain distance in the radial outward direction from the outer circumferential surface of the rotor 26. The rotor 26 is rotated by supplying electric current to the stator 27.

The spindle head 18 is supported by the spindle head support member (first support member) 19 so that the spindle head can be turned in A-axis direction about a first axis of turning 191 that is perpendicular (not parallel) to the spindle center axis line 21. Thus, a through hole 192 of the first support member parallel to the first axis of turning 191 is formed in the spindle head support member 19 to be centered on the axis thereof. Further, a first rotation center shaft 193, which is fixed to a left end portion of the spindle head 18 by bolts, is inserted into the through hole 192 of the first support member and rotatably supported in the spindle head support member 19 via the front bearing 194 and rear bearing 195.

A rotor 196 is fixed to the outer circumferential surface of the first rotation center shaft 193 and a stator 197 is fixed to the inner surface of the through hole 192 of the first support member. The stator 197 is disposed so as to surround the rotor 196, being spaced apart by a certain distance in the radial outward direction from the outer circumferential surface of the rotor 196. When electric current is supplied to the stator 197, the rotor 196 is rotated and the spindle head 18 is turned about the first axis of turning 191 as a center.

A piston 198 is inserted into the through hole 192 of the first support member between the right end of the hole and the front bearing 194 so that the piston can move in parallel to the first axis of turning 191. The piston 198 moves parallel to the first axis of turning 191 by a hydraulic force. An annular array of mating teeth are formed on the right end surface of the piston 198 and annular arrays of mating teeth are formed coaxially also on the left end surface of the outer race and on the left end surface of the inner race of the front bearing 194 respectively. The mating teeth on the piston 198, mating teeth on the outer race of the front bearing 194 and mating teeth of the inner race of the front bearing 194 constitute a three-piece coupling. Thus, when the piston 198 moves to the right, the mating teeth on the piston 198 simultaneously mesh with the mating teeth on the outer race and inner race of the front bearing 194 and clamp the spindle head 18 at the position where the spindle head has been turned.

The spindle head support member 19 is supported by the ram (second support member) 15 so that the spindle support member can be turned in C-axis direction about a second axis of turning 151 that is perpendicular (not parallel) to the first axis of turning 191. Thus, the through hole 152 of a second support member parallel to the second axis of turning 151 is formed in the ram 15 to be centered on the axis thereof. Further, the second rotation center shaft 153 that is fixed by bolts to the spindle head support member 19 is inserted into the through hole 152 of the second support member and rotatably supported on the ram 15 via a bearing 154.

A rotor 155 is fixed to the outer circumferential surface of the second rotation center shaft 153 and a stator 156 is fixed to the through hole 152 of the second support member. The stator 156 is disposed so as to surround the rotor 155, being spaced apart by a certain distance in the radial outward direction from the outer circumferential surface of the rotor 155. When electric current is supplied to the stator 156, the rotor 155 is rotated and the spindle head support member 19 is turned about the second axis of turning 151 as a center.

A piston 157 is inserted into the through hole 152 of the second support member between the lower end of the hole and a bearing 154 so that the piston can move in parallel to the second axis of turning 151. The piston 157 moves in parallel to the second axis of turning 151 by a hydraulic force. An annular array of mating teeth are formed on the lower end surface of the piston 157 and annular arrays of mating teeth are formed coaxially also on the upper end surface of the outer race and the upper end surface of the inner race of the bearing 154 respectively. The mating teeth on the piston 157, the mating teeth on the outer race of the bearing 154 and the mating teeth on the inner race of the bearing 154 constitute a three-piece coupling.

Thus, when the piston 157 moves downward, the mating teeth of the piston 157 simultaneously mesh with the mating teeth on the outer race and inner race of the bearing 154 and clamp the spindle head support member 19 at the position where the spindle head support member has been turned. Further, the clamp mechanism 4 has a draw bar 5, which is inserted into the spindle through hole 22 of the spindle 2 so that the draw bar can move in parallel to the spindle center axis 21 in order to clamp the tool holder 3 to the tapered hole 25 and unclamp it therefrom, and a drive mechanism (cylinder mechanism) 6 that causes the draw bar 5 to move in the unclamping direction.

The draw bar 5 is constituted by a tubular engagement drive portion 51 and a tubular draw bar body 52 that is detachably connected to the engagement drive portion 51. The upper end portion of the engagement drive portion 51 is inserted into the lower end portion of the draw bar body 52, screwed into the inner surface of the lower end portion of the draw bar 52 and fixed there. The engagement drive portion 51 is configured to be inserted into a collet 53 disposed in the vicinity of the tapered hole 25 and cause the collet 53 to be engaged with an engagement step 31 formed at the rear end portion of the tool holder 3.

The collet 53 can expand radially with respect to the upper end portion thereof as a base point and the tilted surface of the outer periphery of the lower end of the engagement drive portion 51 is in slidable contact with the inner surface of the collet 53. When the engagement drive portion 51 is in the uppermost position (top position shown in FIG. 4), the collet 53 is engaged with the engagement step 31, while, when the engagement drive portion is in the lowermost position (bottom position in FIG. 4), the engagement of the collet 53 and engagement step 31 is released.

A large number of counter sunk springs 54 are inserted between the draw bar body 52 and the spindle through hole 22. The reference number 55 denotes a collar member that restricts the axial displacement of the plate springs 54. The counter sunk springs 54 bias the draw bar 5 towards the direction of clamping (upward in FIG. 4). Where the engagement drive portion 51 moves in the direction of clamping under the effect of the biasing force, the collet 53 is expanded and engaged with the engagement step 31, so that the tapered portion 32 of the tool holder 3 is securely fitted in the tapered hole 25.

The drive mechanism 6 has a structure in which a piston 64 is inserted into a cylinder formed by a casing 62, which is fixed by tightened bolts 61 to the upper end portion of the spindle head 18, and a lid member 63. When this piston 64 moves downward from the position shown in FIG. 4 by a hydraulic force, the draw bar 5 is compelled to move in the direction of unclamping (downward in FIG. 4) against the biasing force by the counter sunk springs 54 via the pusher plate 56 and the fit of the taper portion 32 of the tool holder 3 with the tapered hole 25 is released.

A chip suction pipe 33 on the tool holder side that has a chip suction hole 34 formed to be centered on the axis thereof is coaxially inserted into the lower end of the engagement drive portion 51 and the chip suction pipe 33 on the tool holder side is fixed to the tool holder 3 by a nut member 35. A cutting tool (not shown in the figure) is attached to the lower end of the tool holder 3 and a through hole communicating with the chip suction hole 34 is formed to be centered on the axis of the cutting tool.

The upper end portion 521 of the draw bar body 52 is inserted into the lower end portion 711 of a chip suction pipe 71 on the spindle side. The hollow chip suction pipe 71 on the spindle side is inserted into the lid member 63 and the piston 64 and fixed with bolts to the lid member 63. A seal mechanism 8 is provided between the chip suction pipe 71 on the spindle side and the upper end portion 521 of the draw bar 52. The seal mechanism 8 connects the chip suction pipe 71 on the spindle side with the upper end portion 521 so that they can rotate relative to each other and also prevents the external air from being sucked into the chip suction pipe 71 on the spindle side.

Figure 5:
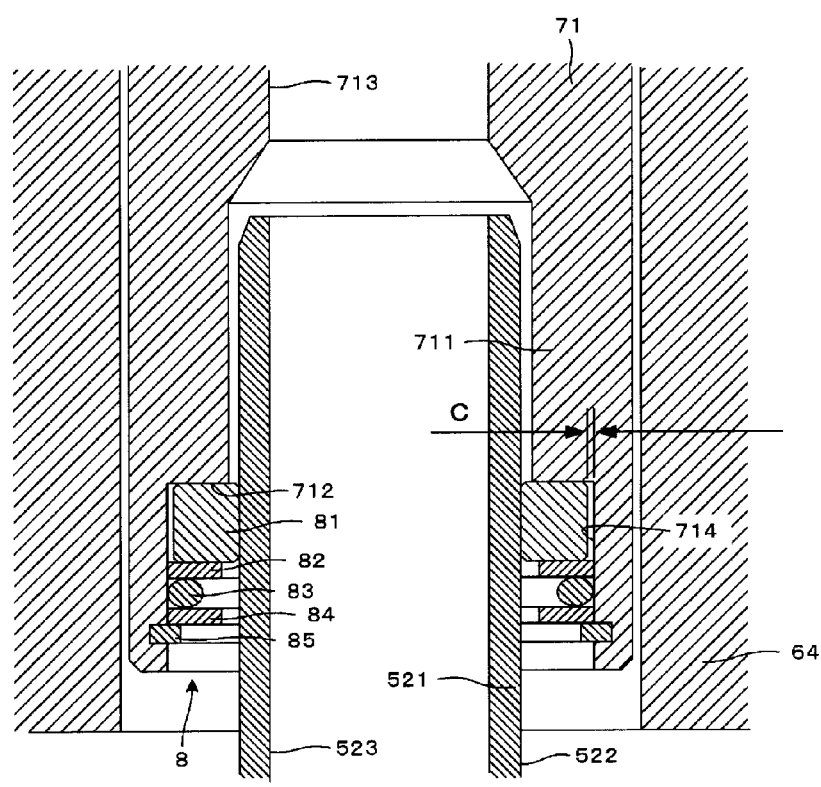
FIG. 5 is an enlarged vertical sectional view of a seal mechanism according to the first embodiment of the present invention.

FIG. 5 is an enlarged vertical sectional view of the seal mechanism 8 according to the first embodiment of the present invention. As shown in FIG. 5, the seal mechanism 8 is provided with a carbon seal ring 81 that is in slidable contact with an outer circumferential surface 522 of the upper end portion 521 of the draw bar body 52, a push ring 83 made of elastic material and serving to press the seal ring 81 against a step 712 of the chip suction pipe 71 on the spindle side, with a spacer 82 being interposed therebetween, and a lock ring 85 that restricts the displacement of the push ring 83 in the axial direction via a spacer 84.

The end surface of the seal ring 81 is pressed by an elastic force of the push ring 83 against the step 712 and the inner circumferential surface of the seal ring 81 is in slidable contact with the outer circumferential surface 522 of the upper end portion 521 of the draw bar body 52, thereby preventing the penetration of air from the outside. Meanwhile, a gap C is formed between the outer circumferential surface of the seal ring 81 and a large-diameter inner circumferential surface 714 on the lower side of a through hole 713 of the chip suction pipe 71 on the spindle side. This gap C makes it possible to prevent the seal ring 81 from damage even when unsteady movement occurs between the draw bar body 52 and the chip suction pipe 71 on the spindle side.

As shown in FIGS. 3 and 4, draw bar through holes 511, 523 are formed so as to penetrate through the engagement drive portion 51 and draw bar body 52 in the axial direction to be centered on the axis thereof. A through hole 713 is also formed so as to penetrate through the chip suction pipe 71 on the spindle side in the axial direction to be centered on the axis thereof. The draw bar through holes 511, 523, through hole 713 of the chip suction pipe 71 on the spindle side and chip suction hole 34 of the chip suction pipe 33 on the tool holder side are arranged to have a same inner diameter.

The right end of a first hollow communicating pipe 72 is detachably secured to the upper end portion of the chip suction pipe 71 on the spindle side by bolts. The left end of the first linking pipe 72 is detachably secured to the upper end portion of the spindle head 18 by bolts. The first communicating pipe 72 is formed to be substantially U-shaped and the right end of a through hole 721 formed to be centered on the axis thereof communicates with the through hole 713 of the chip suction pipe 71 on the spindle side. The inner diameter of the through hole 721 of the first communicating pipe 72 is arranged to be equal to the inner diameter of the through hole 713 of the chip suction pipe 71 on the spindle side. Therefore, the chips generated during cutting are discharged into the through hole 721 of the first communicating pipe 72 through the chip suction pipe 33 on the tool holder side, the draw bar through holes 511, 523 and the through hole 713 of the chip suction pipe 71 on the spindle side.

A suction pipe 73 on the first support member side is disposed in parallel to the first axis of turning 191 and centered on the axis of the through hole 192 of the first support member. The right end (on the right side in FIG. 3) of the suction pipe 73 on the first support member side is fixed to the left end surface of the spindle head 18 by bolts. The outer circumferential surface of the left end of the suction pipe 73 on the first support member side is connected to the inner circumferential surface at the lower end of a second communicating pipe 74 so as to be rotatable relatively thereto. A seal mechanism 8 is provided in the connection portion, thus the external air is prevented from being sucked into the second communicating pipe 74. Because the seal mechanism 8 has a structure identical to that of the above-described seal mechanism 8 shown in FIG. 5, the detailed explanation thereof is omitted.

Therefore, the right end of a through hole 731 formed in the suction pipe 73 on the first support member side to be centered on the axis thereof communicates with the left end of the through hole 721 of the first linking hole 72 through a through hole 181 formed in the spindle head 18. The through hole 721 of the first communicating pipe 72 is formed to be substantially U-shaped and communicates with the through hole 713 of the chip suction pipe 71 on the spindle side and the through hole 181 formed in the spindle head 18 in a smooth manner.

The second communicating pipe 74 is formed to be substantially U-shaped and the upper end thereof is detachably secured to the left end surface of the spindle head support member 19 by bolts. A hollow cylindrical member 77 is fixed to the left end surface of the spindle head support member 19 and the lower end of the second communicating pipe 74 is detachably secured to the left end portion of the cylindrical member 77 by bolts. The lower end of the through hole 741 formed in the second communicating pipe 74 to be centered on the axis thereof communicates with the left end of the through hole 731 of the chip suction pipe 73 on the first support member side.

A chip suction pipe 75 on a second support member side is disposed parallel to the second axis of turning 151 and centered on the axis of the through hole 152 of the second support member. The upper end (on the upper side in FIG. 3) of the chip suction pipe 75 on a second support member side is fixed to the upper end portion of the ram 15 by bolts (not shown in the figure). The outer circumferential surface of the lower end of the chip suction pipe 75 on a second support member side is connected to the inner circumferential surface of a hollow disk member 76 so as to be rotatable relative thereto. A seal mechanism 8 is provided in the connection portion and the external air is prevented from being sucked into the chip suction pipe 75 on a second support member side. Because the seal mechanism 8 has a structure identical to that of the above-described seal mechanism 8 shown in FIG. 5, the detailed explanation thereof is omitted.

The lower end of a through hole 751 formed in the chip suction pipe 75 on a second support member side to be centered on the axis communicates with the upper end of the through hole 741 of the second communicating pipe 74 through a through hole 199 formed in the spindle head support member 19. Further, the upper end of the through hole 751 formed in the chip suction pipe 75 on a second support member side to be centered on the axis communicates with a chip suction device (not shown in the figure) such as a blower fan or a blower turbine. Because the through hole 741 of the second communicating pipe 74 is formed to be substantially U-shaped, the through hole 731 of the suction pipe 73 on the first support member side communicates with the through hole 199 formed in the spindle head support member 19 in a smooth manner.

The inner diameter of the through hole 181 of the spindle head 18, the inner diameter of the through hole 731 of the suction pipe 73 on the first support member side, the inner diameter of the through hole 741 of the second communicating pipe 74, the inner diameter of the through hole 199 of the spindle head support member 19 and the inner diameter of the through hole 751 of the chip suction pipe 75 on a second support member side are arranged to be identical to the inner diameter of the through hole 713 of the chip suction pipe 71 on the spindle side.

Figure 6:
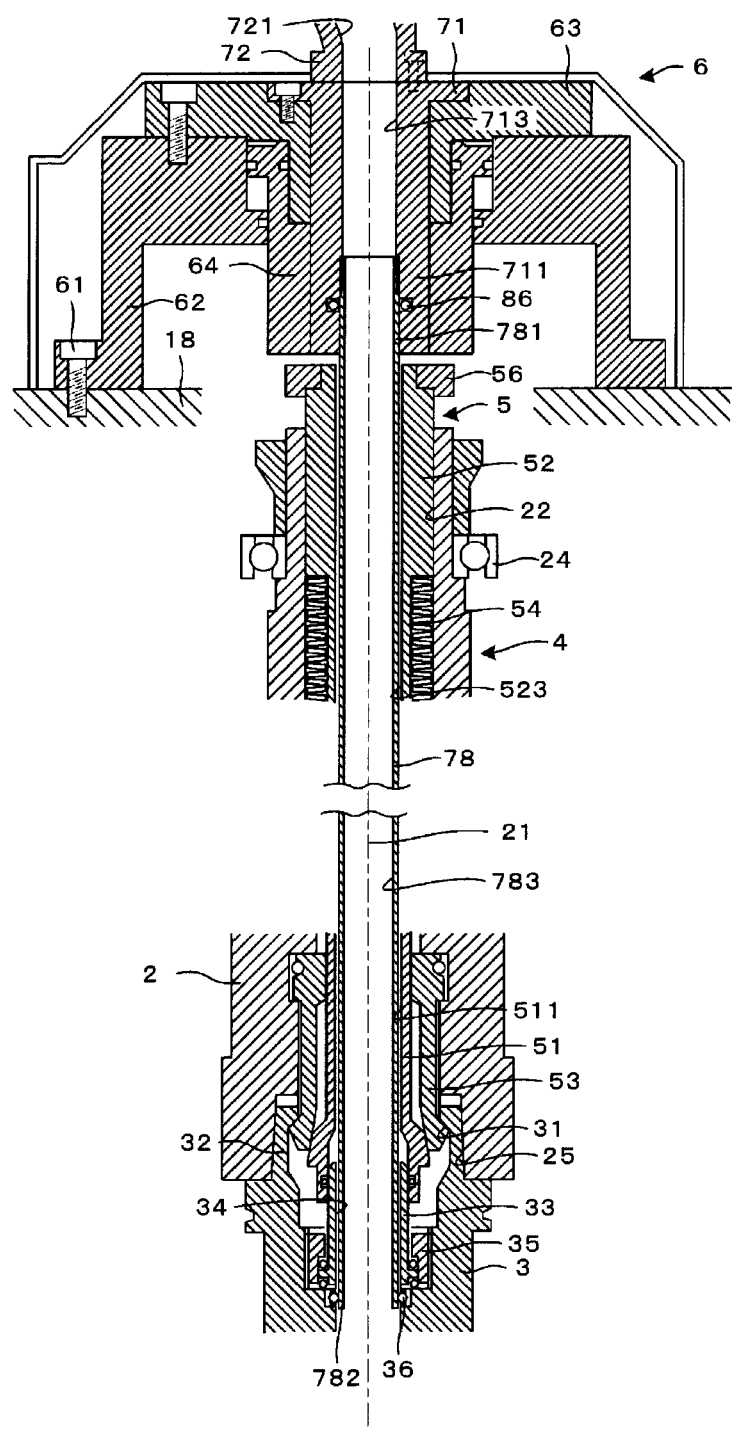
FIG. 6 is a principal enlarged vertical sectional view of the spindle according to the second embodiment of the present invention.

A chip discharge device of a machine tool according to the second embodiment of the present invention will be described below. FIG. 6 is a principal enlarged vertical sectional view of the spindle illustrating the second embodiment of the present invention. In the first embodiment, the chip suction pipe 71 on the spindle side is externally fitted onto the outer circumferential surface 522 of the draw bar body 52. The second embodiment represents an example of configuration in which a chip suction pipe on the spindle side is internally fitted into the draw bar through holes 523, 511 centered on the axes of the draw bar body 52 and engagement drive portion 51 respectively and extended to reach a chip suction port 34 of a tool holder 3, so that the chip suction pipe on the spindle side communicates with the chip suction port 34 of a chip suction pipe 33 on the tool holder side.

Thus, as shown in FIG. 6, in the second embodiment, the chip suction pipe on the spindle side is constituted by a chip suction pipe 71 on the spindle side that is fixed by bolts to a lid member 63 and a lower chip suction pipe 78 that is fixed by screwing into the lower end portion of a through hole 713 of the chip suction pipe 71 on the spindle side. The lower chip suction pipe 78 has a hollow cylindrical shape and a through hole 783 is formed to be centered on the axis thereof.

An O-ring 86 is provided in a lower end portion 711 of the chip suction pipe 71 on the spindle side between the lower end portion 711 and the outer peripheral surface of an upper end portion 781 of the lower chip suction pipe 78. The O-ring 86 enables sealing between the through hole 713 of the chip suction pipe 71 on the spindle side and the outer circumferential surface of the upper end portion 781 of the lower chip suction pipe 78 and prevents the external air from being sucked into the chip suction pipe 71 on the spindle side.

The lower side of the lower chip suction pipe 78 is internally fitted into the draw bar through holes 523, 511 centered on the axes of a draw bar body 52 and an engagement drive portion 51 respectively and internally fitted into the chip suction hole 34 of a chip suction pipe 33 on the tool holder side of the tool holder 3. Further, the outer circumference of a lower end portion 782 of the lower chip suction pipe 78 is pivotally supported by a bearing 36 mounted on the tool holder 3. The bearing 36 is a ball bearing that has no inner race and in which the outer race is press fitted in and fixed to the tool holder 3 and balls serving as rolling bodies are held in a retainer.

Therefore, even when the spindle 2 and tool holder 3 rotate so as to perform cutting, unsteady movement of the lower chip suction pipe 78 is restrained, because the lower end portion 782 of the lower chip suction pipe 78 fixed with respect to the spindle head 18 is pivotally supported by the bearing 36 with respect to the tool holder 3.

Therefore, chips generated during the operation of cutting are smoothly discharged into the through hole 721 of the first communicating pipe 72 through the chip suction pipe 33 on the tool holder side, the through hole 783 of the lower chip suction pipe 78 and the through hole 713 of the chip suction pipe 71 on the spindle side.

As described hereinabove, in the present embodiment, the chip suction pipe 73 on the first support member side is disposed to be centered on the axis of the through hole 192 of the first support portion and connected to the second communicating pipe 74 (spindle head support member 19) so that the chip suction pipe on the first support member side can rotate relative thereto. Therefore, the chip suction pipe 73 on the first support member side does not interfere with the peripheral members of the spindle head 18 and, when the spindle head 18 is turned in A-axis direction with respect to the spindle head support member 19, the chip suction pipe on the first support member side can discharge the chips to the outside through the inside of the spindle head support member 19, without hindering the turning motion of the spindle head 18.

Further, in the present embodiment, the chip suction pipe 75 on the second support member side is disposed to be centered on the axis of the through hole 152 of the second support member and connected to the disk member 76 (spindle head support member 19) so that the chip suction pipe on the second support member side can rotate relative thereto. Therefore, the chip suction pipe 75 on the second support member side does not interfere with the peripheral members of the spindle head 18 and, when the spindle head support member 19 is turned in C-axis direction with respect to the ram 15, the chip suction pipe on the second support member side can discharge the chips to the outside through the inside of the ram 15, without hindering the turning motion of the spindle head support member 19.

Further, in the present embodiment, because the first communicating pipe 72 and the second communicating pipe 74 communicate with the chip suction pipe 71 on the spindle side, chip suction pipe 73 at the first support member and chip suction pipe 75 on the second support member side in a smooth manner, the chips can be smoothly discharged. Further, because the first communicating pipe 72 and the second communicating pipe 74 are detachably secured to the spindle head 18 or spindle head support member 19, the inside of the communicating pipes and the inside of the chip suction pipes can be easily cleaned.

Further, in the present embodiment, the lower chip suction pipe 78, the chip suction pipe 71 on the spindle side, the first communicating pipe 72, the chip suction pipe 73 on the first support member side, the second communicating pipe 74 and the chip suction pipe 75 on the second support member side have an identical inner diameter. Therefore, the chips can be smoothly discharged to the outside, with little accumulation.

Further, in the present embodiment, the seal mechanisms 8 are provided between the draw bar body 52 and the chip suction pipe 71 on the spindle side that rotate relative to each other, between the chip suction pipe 73 on the first support member side and the second communicating pipe 74 and between the disk member 76 and the chip suction pipe 75 on the second support member side. Therefore, the external air is prevented from being sucked in and the chip recovery efficiency can be raised.

For the embodiments of the present invention, it has been explained that the spindle axis line 21 and the first axis of turning 191 are orthogonal to each other and the first axis of turning 191 and the second axis of turning 151 are orthogonal to each other. However, they need only be non-parallel. Further, for the embodiments of the present invention, examples are explained in which the spindle head 18 can be turned in both A-axis direction and C-axis direction. However, the invention is also applicable to the spindle head that can be turned only in A-axis direction.

What is claimed is:

1. A chip discharge device for a machine tool, comprising a spindle head;
   a spindle that is supported by the spindle head to be pivotal with respect thereto and provided with a spindle through hole formed to be centered on the axis of the spindle and parallel to the axis line thereof and that can attach thereto a tool holder having a chip suction hole formed therein for sucking in chips as waste by machining;
   a draw bar that is inserted into the spindle through hole so that the draw bar can move in parallel to the spindle center axis line in order to clamp the tool holder to the spindle and unclamp the tool holder therefrom and provided with a draw bar through hole that is formed to be centered on the axis of the draw bar and parallel to the axis line thereof, the draw bar through hole allowing the chips to pass therethrough, and
   a first support member that supports the spindle head so that the spindle head can be turned about a first axis of turning that is not parallel to the spindle axis line and has a through hole of the first support member formed therein to be centered on the axis thereof, the through hole of the first support member being parallel to the first axis of turning and allowing the chips to pass therethrough.

2. The chip discharge device for a machine tool according to claim 1, further comprising:
   a hollow chip suction pipe on the spindle side that has the draw bar through hole, communicates at one end with the chip suction hole of the tool holder and is fixed at the other end to the spindle head,
   a hollow chip suction pipe on the first support member side that is provided in the first supporting member, has the through hole of the first support member and communicates at one end with a chip suction device, and
   a first communicating pipe that is provided in the spindle head, connected at one end with the chip suction pipe on the spindle side and connected at the other end with the chip suction pipe on the first supporting member.

3. The chip discharge device for a machine tool according to claim 1, further comprising:
   a hollow chip suction pipe on the spindle side that is provided in the spindle head and connected at one end with the draw bar through hole;
   a hollow chip suction pipe on the first support member side that is provided in the first support member and has the through hole of the first support member;
   a second support member that supports the first support member so that the first support member can be turned about a second axis of turning that is not parallel to the first axis of turning and that has a second support member through hole formed to be centered on the axis thereof and parallel to the second axis of turning; and
   a hollow chip suction pipe on the second support member side that is provided in the second support member and has the second support member through hole, wherein
   the chip suction pipe on the spindle side communicates at one end with the chip suction hole of the tool holder and fixed at the other end to the spindle head,
   the chip suction pipe on the first support member side communicates at one end with the chip suction pipe on the spindle side and communicates at the other end with the chip suction pipe on the second support member side, and
   the chip suction pipe on the second support member side communicates at one end with the chip suction pipe on the first support member side and communicates at the other end with a chip suction device.

4. The chip discharge device for a machine tool according to claim 3, wherein
   the spindle axis line and the first axis of turning are orthogonal to each other, and
   the first axis of turning and the second axis of turning are orthogonal to each other.

5. The chip discharge device for a machine tool according to claim 3, wherein
   the chip suction pipe on the first support member side and the chip suction pipe on the second support member side are connected to be able to rotate relatively about the second axis of turning.

6. The chip discharge device for a machine tool according to claim 3, further comprising a first hollow communicating pipe that causes the other end of the chip suction pipe on the spindle side and one end of the chip suction pipe on the first support member side to be communicated with in a smooth manner and is detachably secured to the spindle head.

7. The chip discharge device for a machine tool according to claim 6, wherein the chip suction pipe on the spindle side, the chip suction pipe on the first support member side, the chip suction pipe on the second support member side and the first communicating pipe have a substantially identical inner diameter.

8. The chip discharge device for a machine tool according to claim 3, further comprising a second hollow communicating pipe that causes the other end of the chip suction pipe on the first support member side and one end of the chip suction pipe on the second support member side to be communicated with in a smooth manner and is detachably secured to the first support member.

9. The chip discharge device for a machine tool according to claim 8, wherein the chip suction pipe on the spindle side, the chip suction pipe on the first support member side, the chip suction pipe on the second support member side and the second communicating pipe have a substantially identical inner diameter.

* * * * *